US010710281B2

(12) United States Patent
Cakmak et al.

(10) Patent No.: US 10,710,281 B2
(45) Date of Patent: Jul. 14, 2020

(54) ELECTRIC FIELD "Z" DIRECTION ALIGNMENT OF NANOPARTICLES IN POLYMER SOLUTIONS

(71) Applicants: Mukerrem Cakmak, Lafayette, IN (US); Yuanhao Guo, Akron, OH (US); Saurabh Batra, Minneapolis, MN (US)

(72) Inventors: Mukerrem Cakmak, Lafayette, IN (US); Yuanhao Guo, Akron, OH (US); Saurabh Batra, Minneapolis, MN (US)

(73) Assignee: The University of Akron, Akron ( * ) Notice: Subject to any disclaimer, the term of this patent is extended or adjusted under 35 U.S.C. 154(b) by 493 days.

(21) Appl. No.: 15/527,513

(22) PCT Filed: Nov. 25, 2015

(86) PCT No.: PCT/US2015/062589
§ 371 (c)(1),
(2) Date: May 17, 2017

(87) PCT Pub. No.: WO2016/086089
PCT Pub. Date: Jun. 2, 2016

(65) Prior Publication Data
US 2017/0355155 A1     Dec. 14, 2017

Related U.S. Application Data

(60) Provisional application No. 62/084,956, filed on Nov. 26, 2014.

(51) Int. Cl.
*B29C 71/00*     (2006.01)
*B29C 39/20*     (2006.01)
(Continued)

(52) U.S. Cl.
CPC .......... *B29C 39/203* (2013.01); *B29C 39/146* (2013.01); *B29C 39/16* (2013.01);
(Continued)

(58) Field of Classification Search
CPC . B29C 2043/568; B29C 39/14; B29C 39/142; B29C 39/146; B29C 39/16; B29C 39/18; B29C 39/203; B29C 71/0081
See application file for complete search history.

(56) References Cited

U.S. PATENT DOCUMENTS 4,170,677 A * 10/1979 Hutcheson .............. H01L 21/50
156/272.4
4,548,862 A * 10/1985 Hartman .................. H01B 1/22
174/117 A (Continued)

FOREIGN PATENT DOCUMENTS

CN      1899795 A  *  1/2007
WO    2014194206 A1    12/2014

*Primary Examiner* — Atul P. Khare
(74) *Attorney, Agent, or Firm* — Renner Kenner Greive Bobak Taylor & Weber

(57) ABSTRACT

A method of preparing a polymer film having an oriented dispersed material includes casting a multi-layer polymer solution having a first polymer solution layer and a second polymer solution layer where the second polymer solution layer is at least partially immiscible with the first polymer solution layer. The method further includes passing the multi-layer polymer solution through an electric field application zone, to thereby induce orientation of the dispersed material. A multi-layer polymer film can then be formed by drying the solvent from the multi-layer polymer solution. An apparatus for preparing polymer films includes a top electrode made from a flexible metal mesh coated with a non-stick, non-conductive coating.

17 Claims, 10 Drawing Sheets

(51) Int. Cl.
  *B29C 41/32* (2006.01)
  *B29C 41/12* (2006.01)
  *C08L 27/12* (2006.01)
  *H01B 1/22* (2006.01)
  *B29C 39/16* (2006.01)
  *B29C 39/14* (2006.01)
  *B29L 7/00* (2006.01)
  *B29C 43/56* (2006.01)
  *B29K 105/00* (2006.01)

(52) U.S. Cl.
  CPC .............. *B29C 41/12* (2013.01); *B29C 41/32* (2013.01); *B29C 71/0072* (2013.01); *B29C 71/0081* (2013.01); *C08L 27/12* (2013.01); *H01B 1/22* (2013.01); *B29C 2043/568* (2013.01); *B29K 2105/0073* (2013.01); *B29L 2007/008* (2013.01)

(56) References Cited

U.S. PATENT DOCUMENTS

| | | | |
|---|---|---|---|
| 5,182,050 | A | 1/1993 | Joyce, Jr. et al. |
| 5,231,525 | A * | 7/1993 | Yuasa .................... B29C 55/00 349/124 |
| 6,290,919 | B1 | 9/2001 | Yokoyama et al. |
| 9,169,601 | B2 * | 10/2015 | Helgesen ................ D21H 13/46 |
| 9,437,347 | B2 * | 9/2016 | Svasand .................... H01B 1/24 |
| 10,005,247 | B2 * | 6/2018 | Cakmak .................. B29C 41/28 |
| 10,071,902 | B2 * | 9/2018 | Buchanan ............. B81B 3/0018 |
| 10,090,076 | B2 * | 10/2018 | Knaapila ................ B82Y 30/00 |
| 2004/0141123 | A1 | 7/2004 | Banister et al. |
| 2006/0121076 | A1 | 6/2006 | Ranade et al. |
| 2006/0134211 | A1 | 6/2006 | Lien et al. |
| 2012/0135156 | A1 | 5/2012 | Cakmak |
| 2012/0231178 | A1 | 9/2012 | Svasand et al. |
| 2014/0221629 | A1 | 8/2014 | Tkacik et al. |
| 2016/0089842 | A1 * | 3/2016 | Cakmak ............. B29C 71/0072 264/437 |

* cited by examiner

ELECTRIC FIELD "Z" DIRECTION ALIGNMENT OF NANOPARTICLES IN POLYMER SOLUTIONS

CROSS-REFERENCE TO RELATED APPLICATIONS

The present application claims priority to U.S. Provisional Patent Application No. 62/084,956 filed on Nov. 26, 2014, the contents of which are incorporated herein by reference.

FIELD OF THE INVENTION

One or more embodiments relate to a process for continuous production of nano-composite films having substantially vertically aligned dispersed material, such as particles. One or more embodiments relate to an apparatus for continuous production of nano-composite films having substantially vertically aligned dispersed material, such as particles.

BACKGROUND OF THE INVENTION

Polymer-based nano-composites offer unique properties. These nano-composites are made by adding particles to a polymer matrix to get a nano-composite having properties of both the particles and the polymer matrix. This can result in a synergistic effect, thereby enhancing the properties of the matrix. Important properties include electrical conductivity, thermal conductivity, and dielectric permittivity.

Some nano-composites require high particle loading to reach the required percolation of particles necessary to achieve the desired properties. In one example, more than 50 volume % of dielectric particles was needed to increase the dielectric constant of polymer composites to a sufficient level. There, the thermal conductivity of SiC/epoxy composites was found to be less than 3.9 W*(m*K) when the particle loading was 50%. When high particle loading is utilized, certain properties of the polymers are reduced, such as flexibility, transparency, and processability.

For nano-composite films used in electronic applications, it is generally necessary to use films having enhanced properties in a certain direction. One of the methods to achieve the improvement of properties in a direction that does not require high particle loading is aligning the particles in an electric field. The alignment of electrical or thermally conductive particles can form an electrical or thermal conductive path way. For example, the alignment of lead zirconate titanate (PZT) nanowires in polyvinylidene fluoride (PVDF) in the Z direction can achieve much higher dielectric constant than similar composites with randomly aligned nanowires due to the increased particle-particle interactions after alignment.

Thermal or UV-curable resins are the most commonly used polymer matrix materials for nano-composite films, because of the ease of use in continuous processes. The particles can form chains under an electric field, and then the chain-like particle structures are frozen or cured in the matrix materials by thermal heat or UV light. However, there are disadvantages to using thermal or UV-curable resins such as having a high viscosity such that the particles are unable to move to achieve alignment. Also, the suitable materials are limited to thermoset materials. Where polymer solutions having solvents have been utilized, in-plane alignment has proven difficult for continuous production due to the evaporation of the solvents causing the resulting film to decrease in thickness. This leads to an alteration of the directed alignment of the nanostructure columns. Thus, a need remains for the continuous production of nano-composite films having vertically aligned particles and a smooth top surface

SUMMARY OF THE INVENTION

A first embodiment provides a method of preparing a polymer film having an oriented dispersed material comprising casting a multi-layer polymer solution having a top surface, the multi-layer polymer solution comprising a first polymer solution layer having a first polymer, a first solvent, and a dispersed material, and a second polymer solution layer having a second polymer and a second solvent, where the second polymer solution layer is at least partially immiscible with the first polymer solution layer, supplying an electric field across an electric field application zone, where the electric field is generated by a first electrode having a first charge and a second electrode having a charge opposite of the first, passing the multi-layer polymer solution through the electric field application zone, where the top surface of the multi-layer polymer solution contacts the first electrode to thereby induce orientation of the dispersed material in the first polymer solution layer, and evaporating the first solvent and the second solvent to thereby form a multi-layer polymer film.

A second embodiment provides a method as in the first embodiment, where the second polymer solution layer is fully immiscible with the first polymer solution layer.

A third embodiment provides a method as in the either the first or second embodiment, where the multi-layer polymer film layer includes a target film layer and a sacrificial film layer, the target film layer being formed by the first polymer solution layer, the sacrificial film layer being formed by the second polymer solution layer, further comprising the step of removing the sacrificial film layer from the target film layer, thereby leaving the remaining target film layer with a smooth top surface.

A fourth embodiment provides a method as in any of the first through third embodiments, where the first electrode is a flexible metal mesh wrapped around two rollers, where the flexible metal mesh is coated with a coating that is a non-stick, non-conductive coating with respect to the second polymer solution layer, and further comprising the step of moving the first electrode as the multi-layer polymer solution passes through the electric field application zone.

A fifth embodiment provides a method as in any of the first through fourth embodiments, where the first solvent and the second solvent are the same.

A sixth embodiment provides a method as in any of the first through fourth embodiments, where the first solvent and the second solvent are different.

A seventh embodiment provides a method as in any of the first through sixth embodiments, where the dispersed material in the multi-layer polymer film is substantially vertically oriented with respect to the direction of the polymer film thickness.

An eighth embodiment provides a method as in any of the first through seventh embodiments, where the dispersed material forms two or more substantially vertically aligned chains, where the substantially vertically aligned chains include a depletion zone therebetween.

A ninth embodiment provides a method as in any of the first through eighth embodiments, where the step of casting a multi-layer polymer solution further includes a step of casting the first polymer solution layer, and a step of casting the second polymer solution layer on to the first polymer solution layer.

A tenth embodiment provides a method as in any of the first through ninth embodiments, where the step of casting the first polymer solution layer includes the use of a first doctor blade and the step of casting the second polymer solution layer includes the use of a second doctor blade.

An eleventh embodiment provides a method as in any of the first through tenth embodiments, where the step of casting a multi-layer polymer solution includes the use of a multilayer slot die.

A twelfth embodiment provides a method as in any of the first through eleventh embodiments, where the coating is selected from the group consisting of polytetrafluoroethylene (PTFE), polytrifluoroethylene (PTrFE), and polydimethylsiloxane (PDMS).

A thirteenth embodiment provides a method as in any of the first through twelfth embodiments, where the dispersed material is a plurality of particles.

A fourteenth embodiment provides a method as in any of the first through thirteenth embodiments, where the particles are selected from the group consisting of nickel, barium, lead zirconate titanate (PZT) nanowires, barium titanate, calcium copper titanate, titanium dioxide, graphene, and graphite.

A fifteenth embodiment provides a method as in any of the first through twelfth embodiments, where the dispersed material is an additional polymer.

A sixteenth embodiment provides a method as in any of the first through fifteenth embodiments, where the additional polymer is a conductive polymer, where the conductive polymer is selected from the group consisting of poly (fluorene), polyphenylene, polypyrene, polyazulene, polynaphthalene, poly(pyrrole) (PPY), polycarbazole, polyindole, polyazepine, polyaniline (PAM), poly(thiophene) (PT), poly(3,4-ethylenedioxythiophene) (PEDOT), poly(p-phenylene sulfide) (PPS), poly(acetylene)s (PAC), and poly (p-phenylene vinylene) (PPV).

A seventeenth embodiment provides an apparatus for preparing polymer films comprising an electric field generator defining an electric field application zone and having a first electrode and a second electrode, said first electrode being a flexible metal mesh coated with a non-stick, non-conductive coating and slackly positioned around two rollers, said first electrode supplying a charge and said second electrode supplying a charge opposite of said first electrode, a conveyer being situated to pass a multi-layer polymer solution having a top surface and a dispersed material therein through the electric filed generator to thereby induce orientation of the dispersed material, where said first electrode is capable of contacting said top surface of said multi-layer polymer solution.

An eighteenth embodiment provides an apparatus as in the seventeenth embodiment, where the coating is selected from the group consisting of polytetrafluoroethylene (PTFE), polytrifluoroethylene (PTrFE), and polydimethylsiloxane (PDMS).

A nineteenth embodiment provides an apparatus as in the either the seventeenth or eighteenth embodiments, where the electric field application zone includes an electric field in a range of from 500 Volts/mm to 5000 Volts/mm.

A twentieth embodiment provides an apparatus as in any of the seventeenth through nineteenth embodiments, where the dispersed material is selected from the group consisting of a plurality of particles and a conductive polymer.

DETAILED DESCRIPTION OF ILLUSTRATIVE EMBODIMENTS

Figure 1:
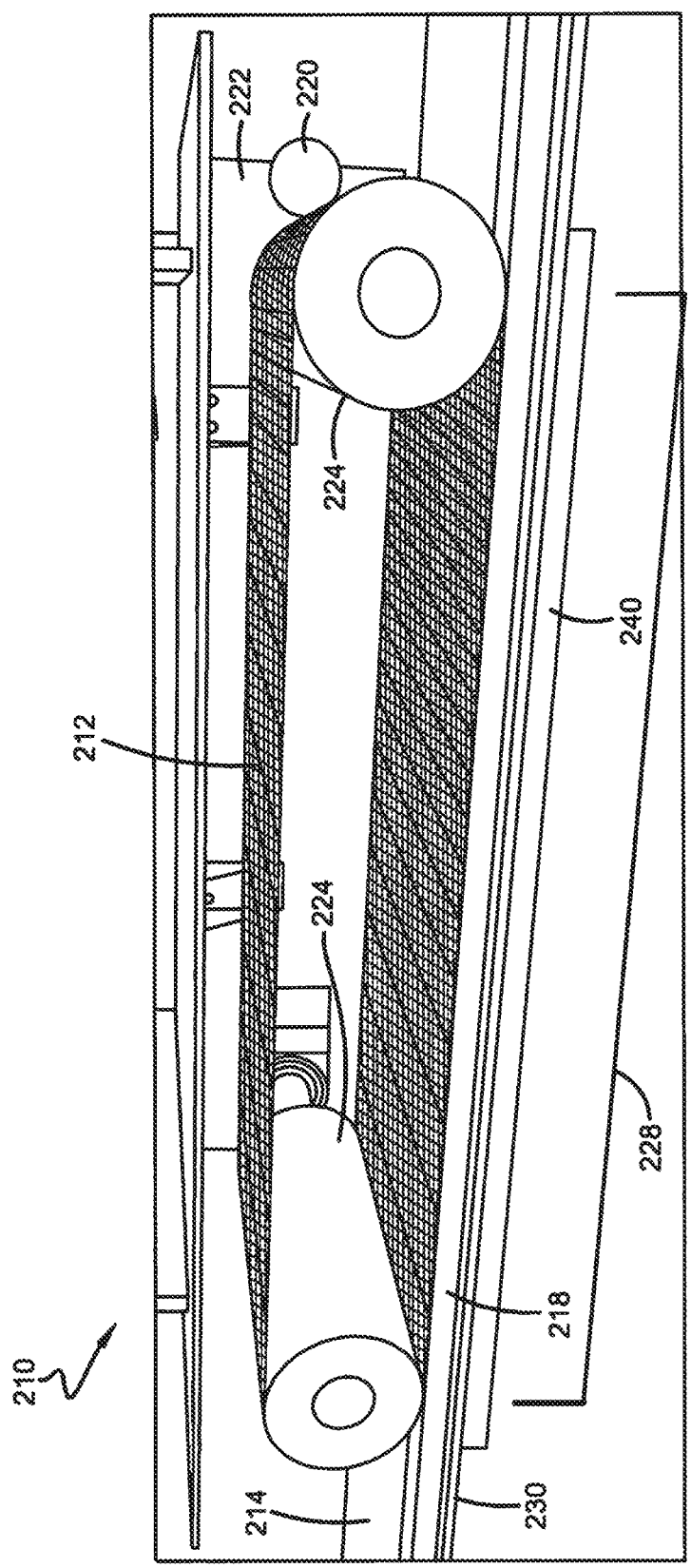
FIG. 1 provides a schematic of one or more embodiments, where a first electrode is a metal mesh coated with a non-stick coating.
Figure 2:
FIG. 2 provides a cross-sectional image showing roughness on the top surface of a film after peeling off the top electrode mesh.
Figure 3:
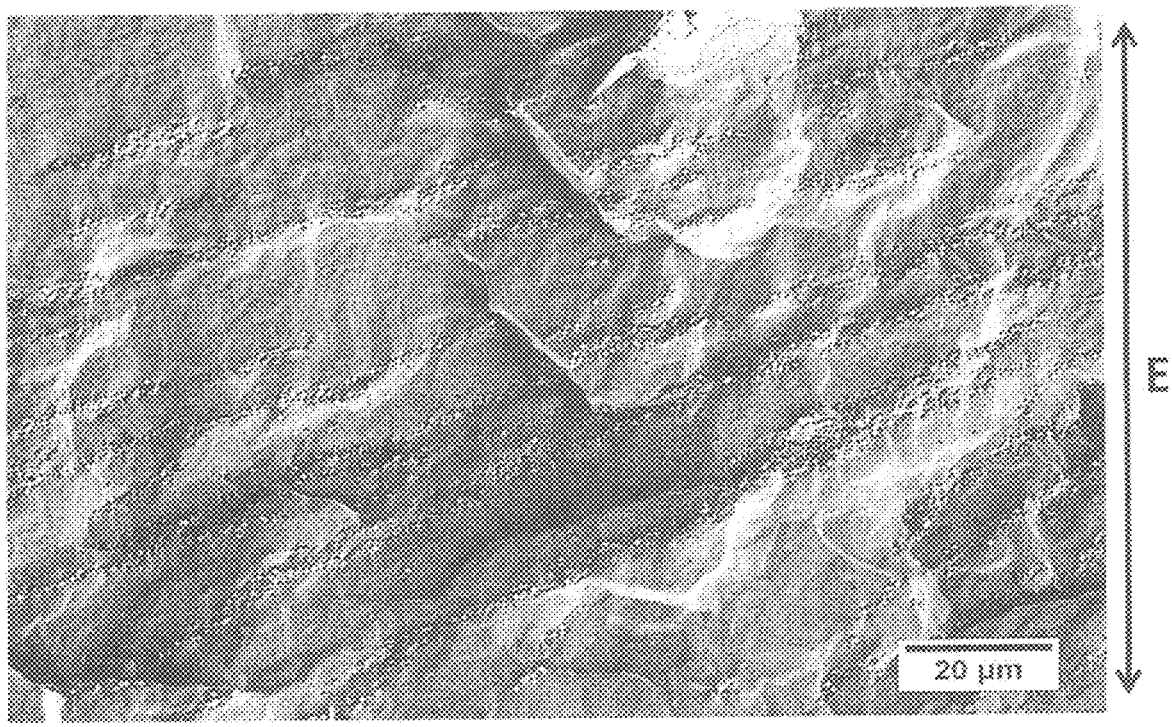
FIG. 3 provides an image showing barium titanate particles forming chains in an electric field.
Figure 4A:
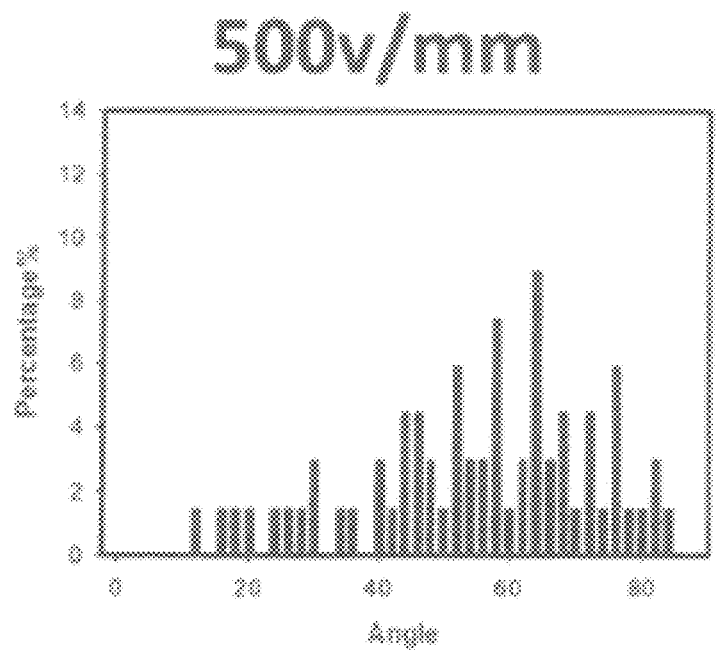
FIG. 4A provides a graph showing the angle distribution for the angles between the chain axes and electric field direction for an embodiment where the polymer is polystyrene, the solvent is toluene, and the particles are barium titanate, at an electric field strength of 500 V/mm.
Figure 4B:
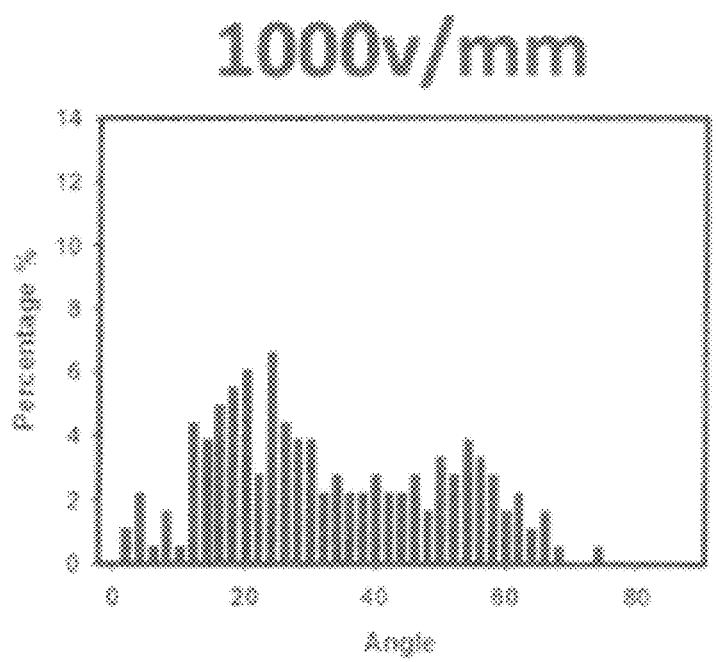
FIG. 4B provides a graph as in FIG. 4A, but at an electric field strength of 1000 V/mm.
Figure 4C:
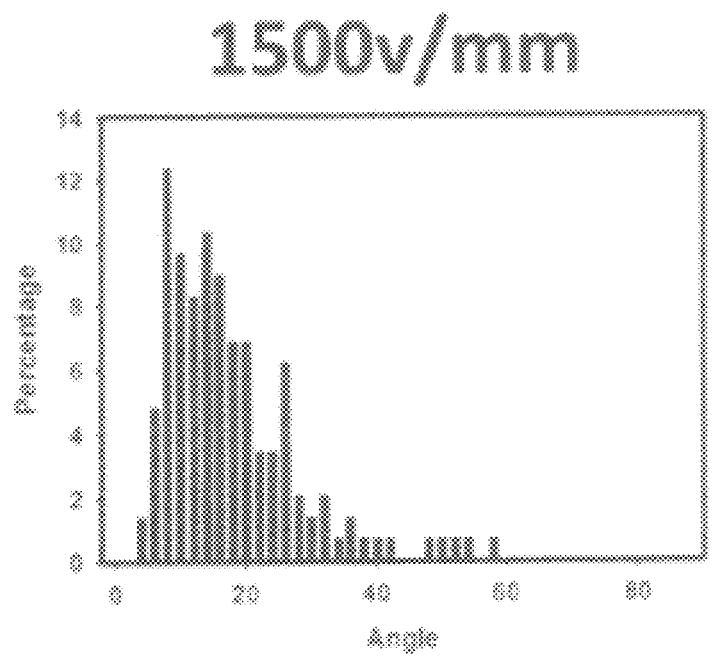
FIG. 4C provides a graph as in FIG. 4A, but at an electric field strength of 1500 V/mm.
Figure 4D:
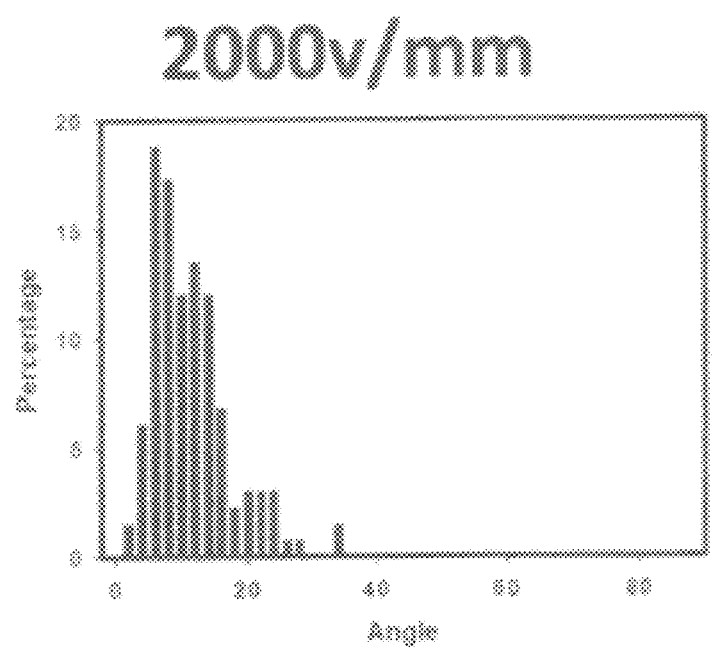
FIG. 4D provides a graph as in FIG. 4A, but at an electric field strength of 2000 V/mm.
Figure 4E:
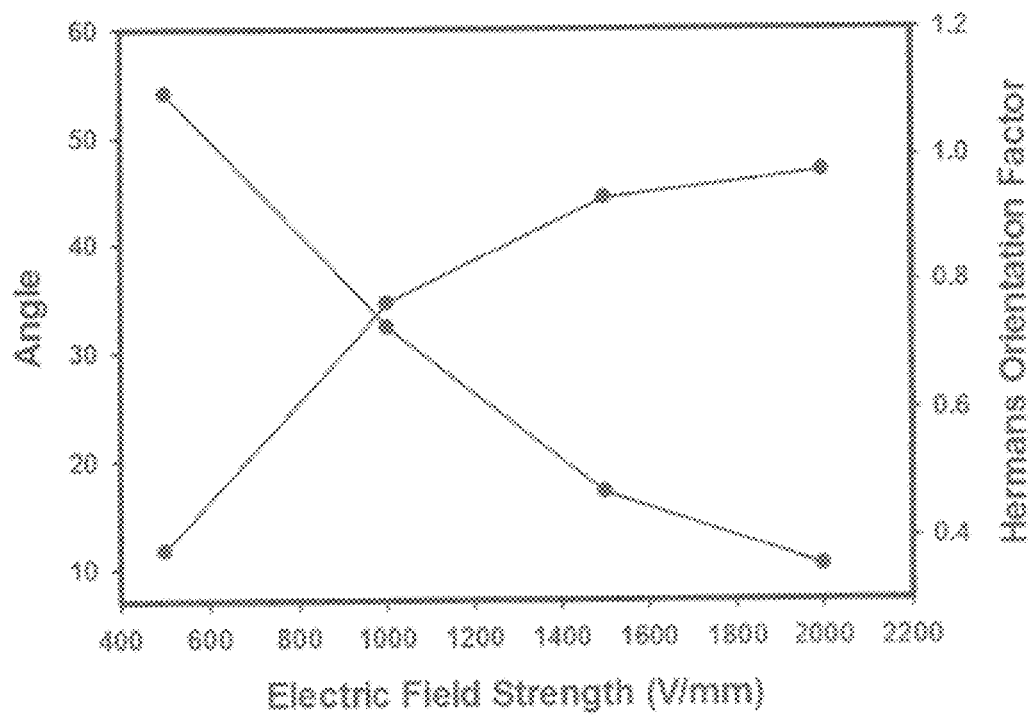
FIG. 4E provides a graph showing the Herman's Orientation Factor and the average angles for the angles between the chain axes and electric field direction at various electric field strengths, for an embodiment where the polymer is polystyrene, the solvent is toluene, and the particles are barium titanate.
Figure 5:
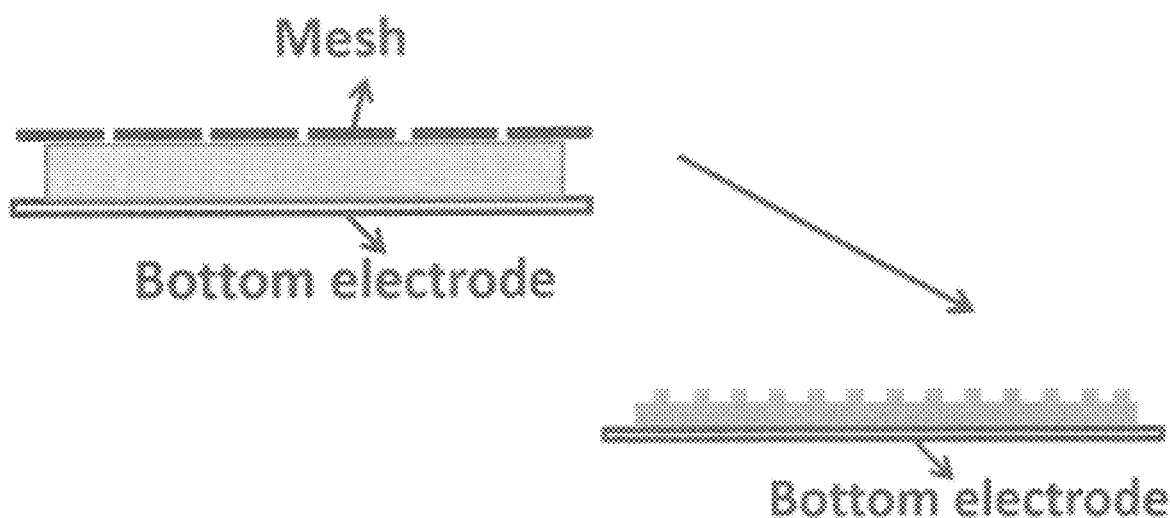
FIG. 5 provides a cross-sectional schematic of a one-layer film.
Figure 6:
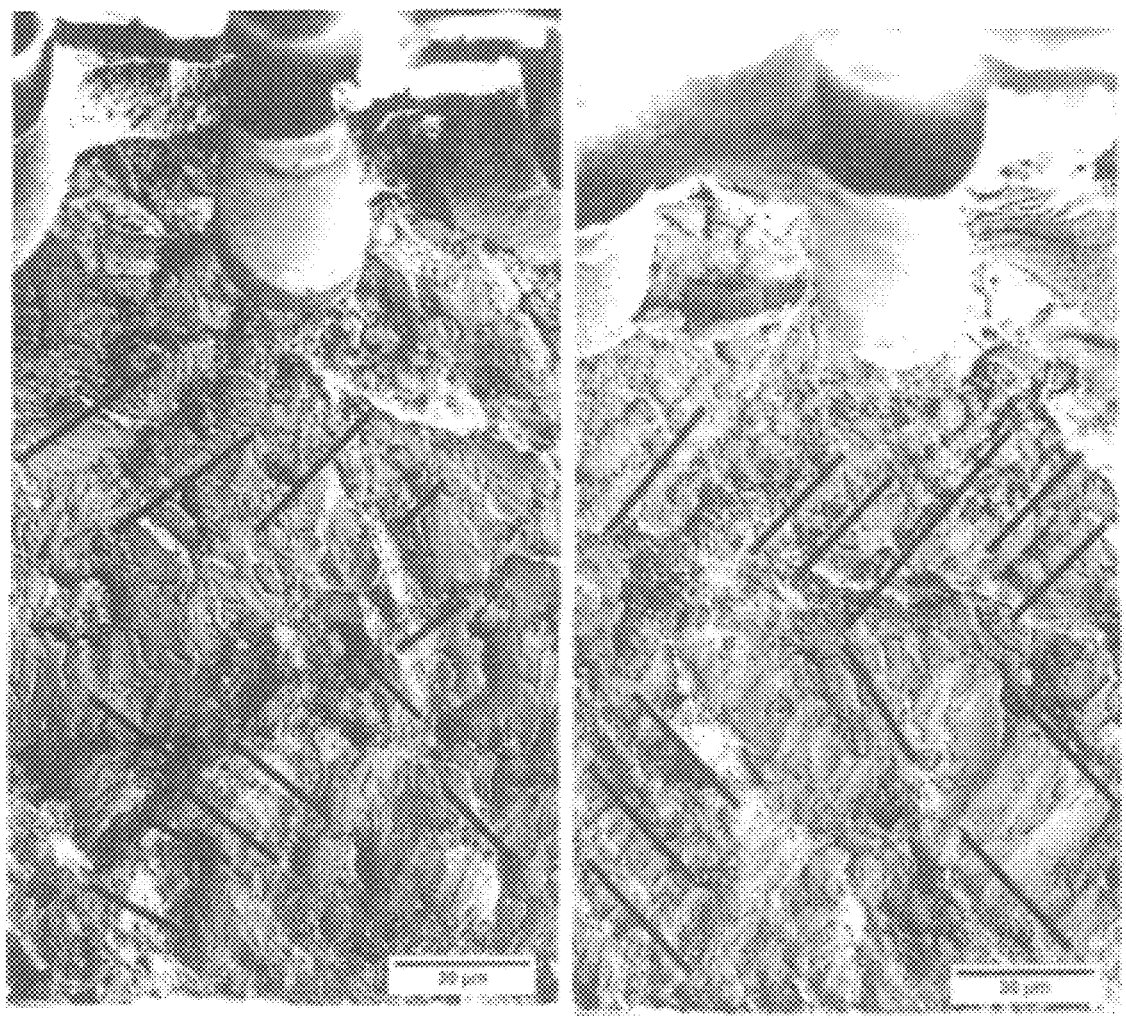
FIG. 6 provides a partial, cross-sectional image of a film, where the image shows the particle chains tilting towards the center region of the sample in transverse direction.

One or more embodiments of the present invention relate to polymer films having vertically aligned dispersed materials. Other embodiments relate to a roll to roll continuous process for producing the polymer films. One or more embodiments utilize a porous material around two rollers as a top electrode. In one or more embodiments, the porous material is a flexible metal mesh coated with a suitable coating. In one or more embodiments, the coating is a non-stick coating. In one or more embodiments, the coating is a non-stick, dielectric, nonconductive coating. One or more embodiments provide a composite film having a smooth top surface. Other embodiments provide a method of forming such smooth-surface film by first forming a two layer film comprising a first polymer layer and a second polymer layer that is immiscible with the first polymer layer.

In one or more embodiments, a method of preparing a polymer film having oriented dispersed material is provided. A polymer solution having dispersed material dispersed therein is cast to a substrate, such as a conveyer. In embodiments where a two-layer film is made, a second polymer solution is cast on to the first polymer solution. In certain embodiments, the second polymer solution is completely immiscible with the first polymer solution. This forms a clear and sharp interface when solidified, thus proving beneficial for embodiments where the top layer is later removed. In other embodiments, the second polymer solution is only partially immiscible with the first polymer solution. These embodiments will create a type of bonding between the top layer and bottom layer. This bonding can also be referred to as a diffusion boundary.

The polymer solution is then moved to an electric field application zone having an electric field. The electric field is supplied across the electric field application zone, where the electric field is generated by a first electrode having a first charge and a second electrode having a charge opposite of the first. The one-layer or two-layer polymer solution can be passed through the electric field application zone. In embodiments utilizing a one-layer polymer solution, the polymer solution layer contacts the first electrode to induce orientation of the dispersed material in the first polymer solution. In embodiments utilizing a two-layer polymer solution, the top polymer solution layer contacts the first electrode to induce orientation of the dispersed material in the lower polymer solution layer.

The one-layer or two-layer polymer solution is formed into a polymer film by evaporating the solvent from the polymer solution. The solvent evaporates through the openings in the porous material. The porous material moves forward at the same speed as the bottom electrode to eliminate the shear stress between the mesh and polymer solution. The evaporation causes the orientation of the dispersed material to freeze in place as the polymer solution dries. In embodiments utilizing two-layer polymer films, the top film layer can be removed from the bottom film layer, such that the bottom film layer is left with a smooth top surface.

As stated above, in one or more embodiments, a polymer solution can be cast in two layers, where the polymer of the first layer is completely immiscible or partially immiscible with the polymer of the second layer. In one or more embodiments, the solvent of the bottom layer is miscible with the top layer, so that the bottom solvent can evaporate through the top layer. In one or more embodiments, a polymer solution having more than two layers can be prepared by repeating certain steps as provided herein.

Only the top layer touches the mesh electrode, so that the surface roughness is only on the top layer of the film after drying. But, the top layer's continuous contact with the electrode facilitates electric field communication through the bottom layer as to induce alignment of the conductive dispersed material.

The top layer acts as a protective layer and the bottom layer is the target layer having aligned dispersed material. The top layer can also be described as a sacrificial layer. By protective layer, it is meant that the top layer protects the bottom layer from receiving any surface roughness from the mesh. By sacrificial layer, it is meant that the top layer might be sacrificed as byproduct material in order to obtain a bottom layer having a smooth top surface. By target layer, it is meant that the bottom layer is desired as the eventual product, as it will be left with a smooth top surface.

Figure 8:
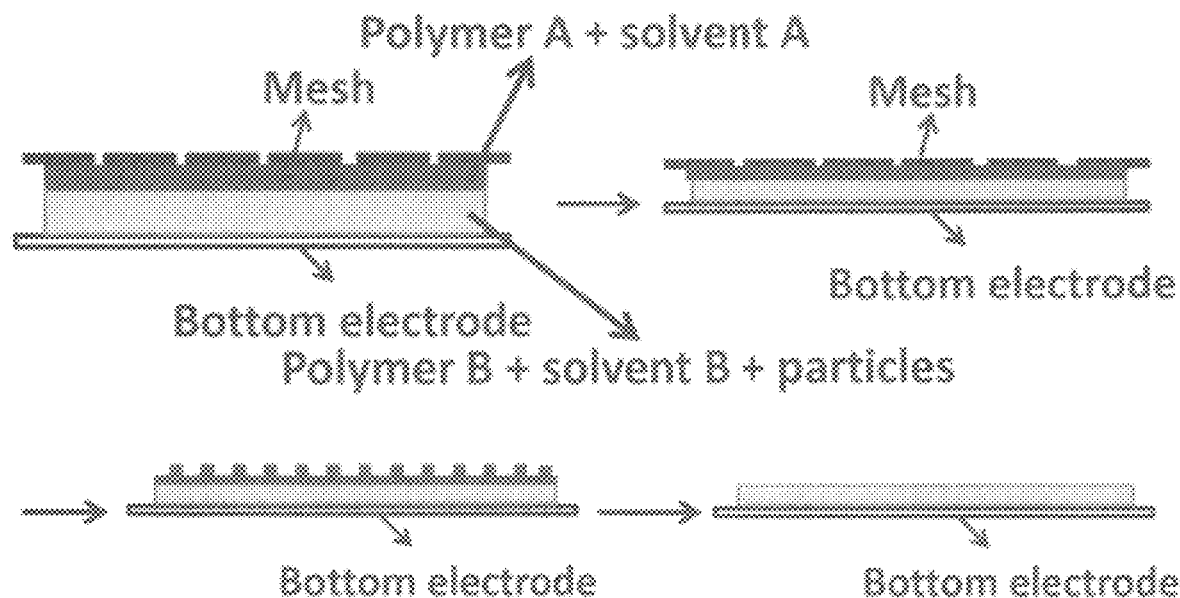
FIG. 8 provides a cross-sectional schematic of a method of utilizing a two-layer film to produce a film having a smooth top surface.
Figure 9:
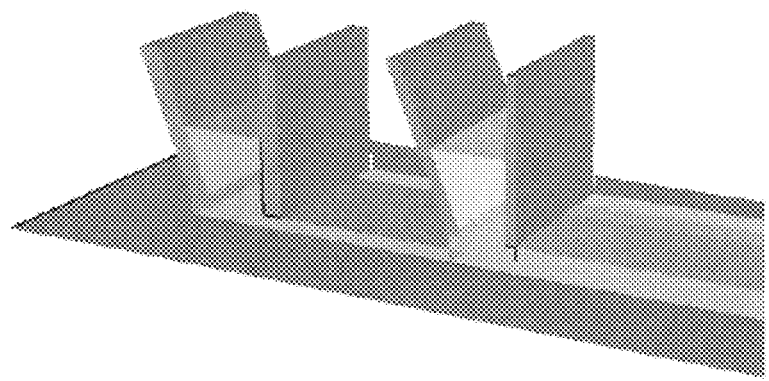
FIG. 9 provides a schematic of a double doctor blade for forming a two-layer film.
Figure 10A:
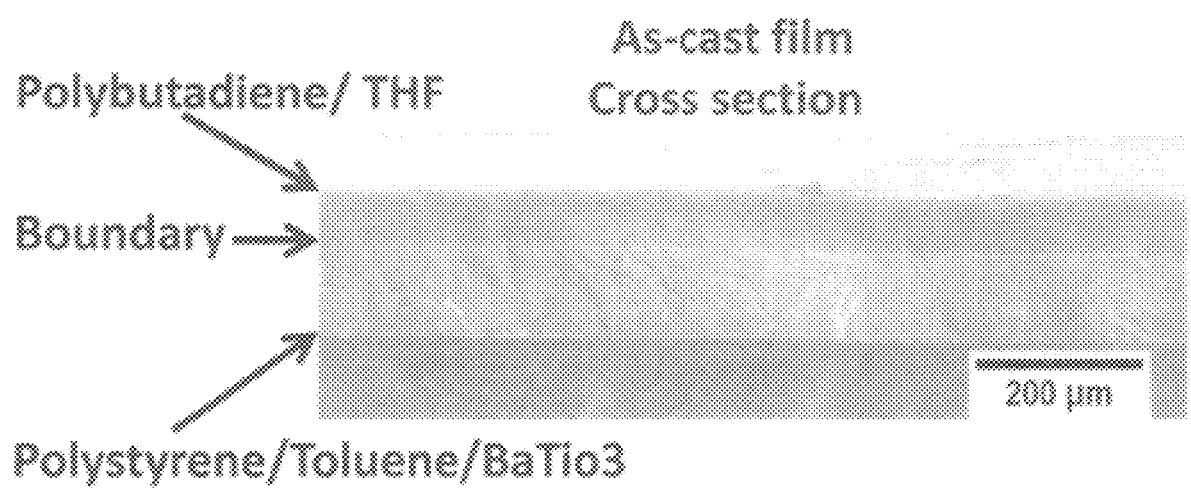
FIG. 10A provides a cross-sectional image showing a two-layer film.
Figure 10B:
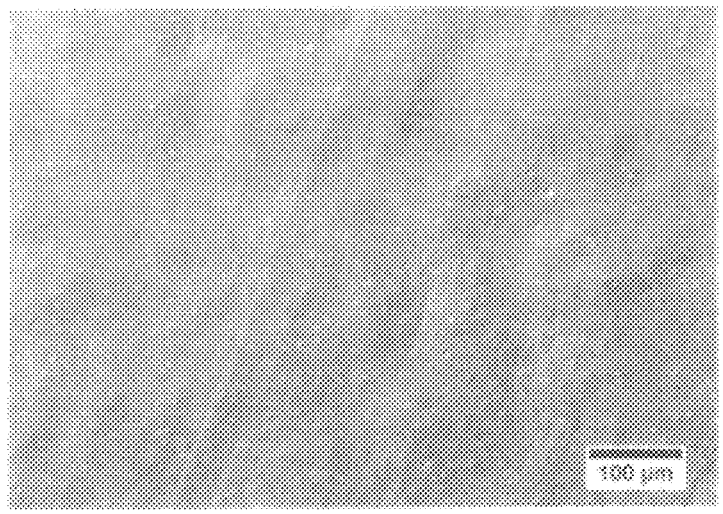
FIG. 10B provides an image showing the smooth top surface after a two-layer film is utilized to produce a film having a smooth top surface.

After peeling off the mesh from the two-layer film, there is an imprinted roughness on the top surface of the film. The size of the roughness is dictated by the mesh wire size, which will be further described below. Because of the phase separation of the immiscible polymers, the sacrificial top layer can be removed easily, giving the remaining bottom layer a smooth top surface. FIG. 8 shows a schematic of the two-layer process and FIG. 10B shows an image of the smooth surface that is obtained.

Figure 11:
FIG. 11 provides a cross-sectional image of a two-layer film before the top layer has been removed, and the resulting film having a smooth top surface after the top layer has been removed.
Figure 11:
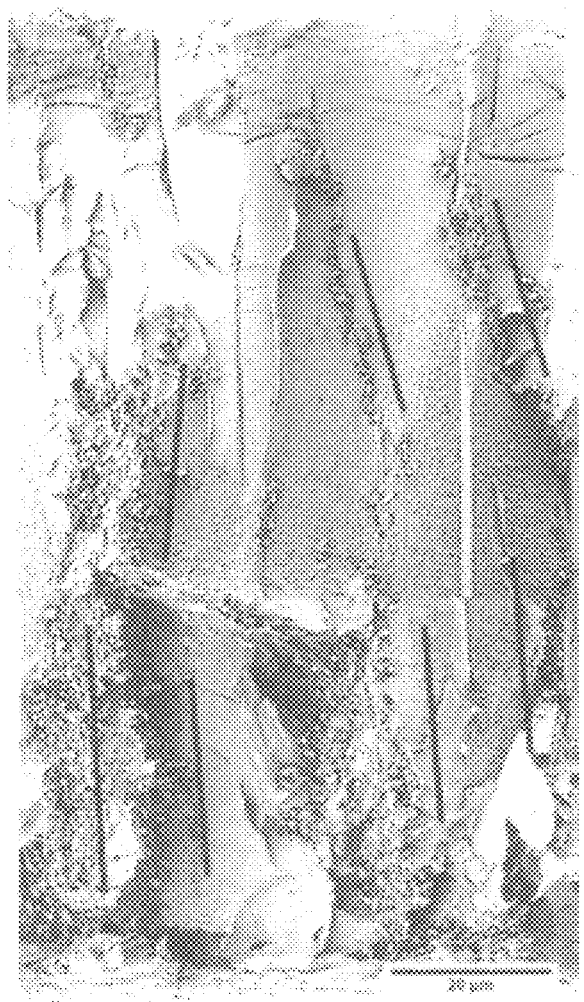

FIG. 11 shows a cross-sectional view of a two-layer film before removing the top layer and the resulting bottom layer after the top layer is removed. As discussed above, the mesh only touches the top layer solution so the roughness is only on the top layer. The particles in the bottom layer form aligned particle chains due to the dipole-dipole interaction in the electric field. After peeling off the top layer, the aligned particle chains can still be observed and the top surface of the bottom layer is smooth.

In one or more embodiments, a polymer solution can be cast in a single layer. But, the single layer polymer films having aligned dispersed material will include roughness on the top surface of the film after peeling off the mesh.

The two-layer and one-layer polymer solutions can be cast using a doctor blade on to a roll to roll processing line. For a two-layer polymer solution, a first doctor blade can be used to cast the first layer, and a second doctor blade can be used to cast the second layer. In one or more embodiments, the polymer solution can be prepared upstream from the electric field generator. The polymer solution can be prepared by polymer film casting. A slot die can be utilized in the casting process. In one or more embodiments, the two or more polymer solution layers can be deposited on to a carrier using a multilayer slot die. Other conventional methods of polymer film casting can be used.

In one or more embodiments, the width of a doctor blade casting can be in a range of from 1 inch to 56 inches. In one or more embodiments, the width of a doctor blade casting can be in a range of from 3 inches to 12 inches.

In one or more embodiments, a continuous process can be characterized by the speed of the process, which can be referred to as the speed of a processing line. In one or more embodiments, the speed of a processing line can be in a range of from 0.1 cm/min to 1000 cm/min. In one or more embodiments, the speed of a processing line can be in a range of from 10 cm/min to 100 cm/min.

The gap between the upper electrode and bottom electrode can be adjustable based on a desired polymer solution. In one or more embodiments, the gap between the upper electrode and bottom electrode can be in a range of from 0.0005 mm to 5 mm. In one or more embodiments, the gap between the upper electrode and bottom electrode can be in a range of from 0.01 mm to 2 mm.

Using one or more methods as described above, the first layer of polymer solution, or only layer of polymer solution, comprises a polymer, a solvent, and a dispersed material. In one or more embodiments, where a second layer of polymer solution is present, the second polymer is immiscible with the first polymer and the second solvent is miscible or partially miscible with the first solvent. The second solvent can be the same as the first solvent or the second solvent can be different than the first solvent.

The polymer of the first layer of polymer solution, or only layer of polymer solution, can be any polymer that can be dissolved in a solution. Exemplary polymers can be selected from list consisting of polystyrene (PS), polyvinylidene fluoride (PVDF), polyethylenimide (PEI), polyimide (PI), polymethyl methacrylate, polycarbonate, poly amic acid, and poly amide imide. The polymer should be suitable for solution casting. Advantageously, the present invention can utilize polymers having higher glass transition ($T_g$) temperatures.

The polymer of a second layer of polymer solution can be any polymer that is at least partially immiscible with the polymer of the first layer of polymer solution. In one or more embodiments, the polymer of a second layer of polymer solution is partially immiscible with the polymer of the first layer of polymer solution. In one or more embodiments, the polymer of a second layer of polymer solution is fully immiscible with the polymer of the first layer of polymer solution. The particular immiscibility that is utilized can be designed based on the desired final product. Particular polymers suitable for use in a second layer of polymer solution will be known to those skilled in the art based on knowing which polymers are immiscible with the polymer of a first layer. The polymer used in a second layer must be able to be dissolved in a solvent that can be removed by evaporation.

In one or more embodiments, the thickness of a polymer film having aligned particles is in a range of from 0.0001 mm to 2 mm. In one or more embodiments, the thickness of a polymer film having aligned particles is in a range of from 0.0001 mm to 1 mm. In one or more embodiments, the thickness of a polymer film having aligned particles is in a range of from 0.0001 mm to 0.01 mm. In one or more embodiments, the thickness of a polymer film having aligned particles is in a range of from 0.0001 mm to 0.001 mm. In one or more embodiments, the thickness of a polymer film having aligned particles is in a range of from 0.1 mm to 1 mm. In one or more embodiments, the thickness of a polymer film having aligned particles is less than 1 mm. In one or more embodiments, the thickness of a polymer film having aligned particles is less than 0.01 mm.

In one or more embodiments where two layers of polymer solution are utilized, the thickness of the first layer is in a range of from 0.0001 mm to 2 mm, and the thickness of the second layer is in a range of from 0.0001 mm to 2 mm. In one or more embodiments where two layers of polymer solution are utilized, the thickness of the first layer is in a range of from 0.05 mm to 1 mm, and the thickness of the second layer is in a range of from 0.05 mm to 1 mm. In one or more embodiments where two layers of polymer solution are utilized, the thickness of the first layer is in a range of from 0.1 mm to 1 mm, and the thickness of the second layer is in a range of from 0.1 mm to 1 mm. In one or more embodiments where two layers of polymer solution are utilized, the thickness of the first layer is less than 1 mm, and the thickness of the second layer is less than 1 mm. In one or more embodiments where two layers of polymer solution are utilized, the thickness of the first layer is less than 0.5 mm, and the thickness of the second layer is less than 0.5 mm.

The solvent of the first polymer solution layer, or only polymer solution layer, can be selected from toluene, hexane, cyclopentane, and cyclohexane. Where present, the solvent of the second polymer solution layer can be selected from tetrahydrofuran (THF), toluene, hexane, cyclopentane, and cyclohexane. As stated above, the solvent of a lower polymer solution layer must be capable of evaporating through the top polymer layer, or by some other method.

Other suitable solvents include 1,4-dioxane, carbon disulfide, chloroform, pentane, cyclohexanone, acetone, methylene chloride, carbon tetrachloride, dibutyl ether, ethylene dichloride, chloroform, ethanol, isopropyl alcohol (IPA), butanols, MEK, MIBK, heptane, and 1-pentanol. Other suitable solvents might be known to one skilled in the art as made available in appropriate handbooks. Combinations of suitable solvents can also be utilized.

In one or more embodiments, the concentration of polymer in solvent in a polymer solution is from about 5 weight percent to about 50 weight percent, in other embodiments from about 10 weight percent to about 45 weight percent, in other embodiments from about 15 weight percent to about 40 weight percent, in other embodiments from about 20 weight percent to about 35 weight percent, in still other embodiments from about 25 weight percent to about 30 weight percent. The viscosity of a polymer solution can be adjusted by modifying the concentration of solvent.

As disclosed above, the first layer of polymer solution, or only layer of polymer solution, comprises a dispersed material. As used herein, dispersed material can be defined as a substance included with a polymer and solvent to form a polymer solution. The dispersed material can be selected from the group consisting of particles and additional polymer. In one or more embodiments, the dispersed material is substantially aligned in the vertical direction.

The dispersed material is provided to give an additional function to the resulting polymer films. Such additional functions include electrical conductivity, thermal conductivity, and dielectric permittivity. Where only electrical conductivity is desired, the conductive dispersed material may not need to touch to form a connected network for the electrical conductivity due to tunneling. In these embodiments, reasonable proximity between the individual components of dispersed material would be sufficient. For thermal conductivity, phonon transmission from particle to particle requires contact. Thus, for thermal conductivity, higher concentration of individual components of dispersed material may be needed. The dispersed material can also enhance the dielectric constant in the thickness direction in the films.

The dispersed material forms chains whose axes generally orient primarily along the thickness of the solution (that is, in the direction of the applied electric field) due to the applied electric field. The directional orientation can also be described as vertical orientation, where the chains are vertically oriented with respect to the polymer thickness. The vertical direction is the direction parallel with the thickness of the polymer solution (i.e., normal of the surface). The vertical orientation can also be described as Z-direction orientation or Z-orientation.

In relatively stronger electric fields, such as 1500 V/mm and 2000 V/mm, substantial vertical alignment of the chains of dispersed material in the polymer solution can be sustained. These chains, or columns, of dispersed material are able to maintain their orientation substantially parallel to the electric field while drying of the solvent takes place.

However, in weaker electric fields, such as 500 V/mm and 1000 V/mm, an angle less than substantially vertical might occur between the chain axes and the electric field direction. The dispersed material first orients into chains in the direction substantially parallel to the electric field, but the drying of the solvent causes a compressive force on the chains due to thickness reduction as a result of solvent loss. The compression forces are higher than the dielectrophoretic forces, thus causing tilting and buckling of the already formed columns away from the electric field lines. The angle, or tilt direction, of the chains can be controlled by the drying gradient during the transition of the solution to a film.

In one or more embodiments, the dispersed material is a plurality of particles. The particles can also be defined as functional particles. In one or more embodiments, the particles are nanoparticles. Suitable particles include conductive particles, semi-conductive particles, and di-electric particles. Where di-electric particles are utilized, the electric field can be used to effect the spatial arrangement of the di-electric particles.

The particles can be selected from nickel, barium, lead zirconate titanate (PZT) nanowires, barium titanate, calcium copper titanate, titanium dioxide, graphene, and graphite. Suitable conductive particles can be prepared from Co, Ni, CoPt, FePt, FeCo, $Fe_3O_4$, $Fe_2O_3$, and $CoFe_2O_4$. Suitable semi-conductive particles can be prepared from ZnS, CdSe, CdS, CdTe, ZnO, Si, Ge, GaN, GaP, GaAS, InP, and InAs. Additional particles that may be conductive or semi-conductive include carbon based nanoparticles, carbon black, carbon nanotubes (single as well as multi-walled) as well as other inorganic and organic synthetic or natural nanoparticles. Suitable dielectric particles include organically modified clays, glass spheres, and glass fibers. Combinations of the above suitable particles can also be utilized.

In one or more embodiments, the concentration of particles based on the amount of polymer solution in a layer is in the range of from 0.003% to 50%. In one or more embodiments, the concentration of particles based on the amount of polymer solution in a layer is in the range of from 0.01% to 10%. In one or more embodiments, the concentration of particles based on the amount of polymer solution in a layer is in the range of from 0.1% to 10%. In one or more embodiments, the concentration of particles based on the amount of polymer solution in a layer is in the range of from 1% to 5%. In one or more embodiments, the concentration of particles based on the amount of polymer solution in a layer is less than 10%. In one or more embodiments, the concentration of particles based on the amount of polymer solution in a layer is less than 5%.

In one or more embodiments, the average size of the particles is in the range of from 2 nm to 100 μm. In one or more embodiments, the average size of the particles is in the range of from 50 nm to 10 μm. In one or more embodiments, the average size of the particles is in the range of from 100 nm to 10 μm. In one or more embodiments, the average size of the particles is in the range of from 100 nm to 1 μm. In one or more embodiments, the average size of the particles is in the range of from 10 nm to 1 μm. In one or more embodiments, the average size of the particles is less than 10 μm. In one or more embodiments, the average size of the particles is less than 1 μm. In one or more embodiments, the average size of the particles is less than 100 nm.

In one or more embodiments, the dispersed material is an additional polymer. In one or more embodiments, the additional polymer can be selected from the group consisting of polystyrene (PS), polyvinylidene fluoride (PVDF), polyethylenimide (PEI), polyimide (PI), polymethyl methacrylate, polycarbonate, poly amic acid, and poly amide imide.

In one or more embodiments, the additional polymer is a conductive polymer, which can also be described as an intrinsically conducting polymer (ICP). Conductive polymers are organic polymers that are capable of conducting electricity. In one or more embodiments, the conductive polymer is selected from the group consisting of poly (fluorene), polyphenylene, polypyrene, polyazulene, polynaphthalene, poly(pyrrole) (PPY), polycarbazole, polyindole, polyazepine, polyaniline (PANI), poly(thiophene) (PT), poly(3,4-ethylenedioxythiophene) (PEDOT), poly(p-phenylene sulfide) (PPS), poly(acetylene)s (PAC), and poly (p-phenylene vinylene) (PPV).

In one or more embodiments, the concentration of additional polymer based on the amount of polymer solution in a layer is in the range of from 0.003% to 50%. In one or more embodiments, the concentration of additional polymer based on the amount of polymer solution in a layer is in the range of from 0.01% to 10%. In one or more embodiments, the concentration of additional polymer based on the amount of polymer solution in a layer is in the range of from 0.1% to 10%. In one or more embodiments, the concentration of additional polymer based on the amount of polymer solution in a layer is in the range of from 1% to 5%. In one or more embodiments, the concentration of additional polymer based on the amount of polymer solution in a layer is less than 10%. In one or more embodiments, the concentration of additional polymer based on the amount of polymer solution in a layer is less than 5%.

The one or more methods described above can be carried out by an apparatus for preparing a polymer film. An apparatus for preparing a polymer film using an electric field can be referred to as an electric field generator. As stated above, the electric field generator can be utilized in a continuous process. In one or more embodiments, a continuous process can include a roll to roll process, where a polymer solution is provided to a processing roll or conveyer. The polymer solution can be moved through an electric field application zone to induce orientation in the polymer solution. After drying the solvent, the resulting polymer film can be rerolled on a take-up roll downstream from the electric field application zone.

In one or more embodiments, the electric field generator can be included in a polymer film processing device. The polymer film processing device can include one or more other zones for processing a polymer film. In certain embodiments, the zones of the polymer processing device are situated along a roll-to-roll processing line. Exemplary zones for processing a polymer that can be included in a polymer processing device include, but are not limited to, solvent evaporation zones, annealing zones, UV curing zones, magnet zones, steady shear zones, and oscillatory shear zones. An exemplary polymer processing device is described in Publication No. WO 2011/008870, which is incorporated by reference.

In one or more embodiments, an electric field generator comprises a first electrode that can supply a charge comprising a conductive belt around two rollers opposite a second electrode that can supply a charge opposite of the first electrode; a conveyer, wherein the conveyer is situated to pass a polymer through the electric filed generator; an adjustable interstice for adjusting the distance between the first electrode and the second electrode, and wherein the adjustable interstice can adjust the distance between the first and second electrode to keep the first and second electrode in contact the polymer film; and means for freezing the orientation of the polymer film with the electric field application zone. The electric field application zone is the zone between the first and second electrodes where the electric field is present.

In one or more embodiments, the first electrode is a belt wrapped around two rollers. In these or other embodiments, the belt rotates as the polymer solution is moved through the electric field application zone. Because the first electrode is in contact with the polymer solution, a difference in speed between the polymer solution and the rotating first electrode might create a shearing effect in the polymer solution. In one or more embodiments, the first electrode moves at the same speed as the polymer solution to avoid shearing. In other embodiments, the first electrode is rotated at a different speed than the polymer solution to provide shearing.

A representative example of an electric field generator 210 is shown in FIG. 1. Electric field generator 210 includes a back plate 222 having two rollers 224. A conductive belt 212 is wrapped around rollers 224. Conductive belt 212 can be described as a metal mesh. Conductive belt 212 can also be described as a perforated metal belt. Conductive belt 212 can be coated with a non-stick coating.

A voltage source 220 is in contact with conductive belt 212. In one or more embodiments, voltage source 220 can be spring loaded (not shown) to be in constant contact with electrode 212. The height of conductive belt 212 can be adjusted by moving back plate 222. Conductive belt 212 may be adjustable so that it contacts a polymer solution 214. Polymer solution 214 optionally rests upon and is transported under the conductive belt 212 by conductive substrate 218. In one or more embodiments, conductive substrate 218 can be an electrode or a ground. In one or more embodiments, the conductive substrate 218 can rest upon a conveyer 230 that can act as an electrode or a ground. In other embodiments, the polymer solution 214 can rest directly upon the conveyer 230. The electric field application zone 228 is the area between the conductive belt 212 and the other electrode (substrate 218 or conveyer 230). A heating zone 240 can be situated under the polymer film 214 to evaporate the solvent to preserve the orientation of the polymer film prior to the film exiting the electric field application zone 218. Advantageously, it has been found that when an electric field is generated with a first and a second electrode in contact with a polymer solution, as opposed to two plates with an air gap, better orientation can be obtained with using an electric field of a smaller power.

In one or more embodiments, alternating current (AC) can be used with the electric field generator. In other embodiments, direct current (DC) can be used with the electric field generator. In certain embodiments, the type of current can be selected to provide a particular orientation within a polymer. For example, if a di-electric particle is dispersed in the polymer solution, AC can be used to organize the dielectric particles into chains. Alternatively, if a gradient of particles is desired, DC can be used.

As noted above, it has been found that when a first electrode and second electrode are in contact with the polymer film, a low voltage can be used to create an electric field to induce orientation in a polymer film. In one or more embodiments, the voltage is less than the breakdown voltage of the system. In one or more embodiments, the voltage is less than the polymer breakdown voltage. In one or more embodiments, the voltage is between 1 Volt and the polymer breakdown voltage. In one or more embodiments, the voltage is in a range of from 0.1 Volts to 3 KiloVolts. In one or more embodiments, the voltage is in a range of from 0.5 Volts to 1 KiloVolts. In one or more embodiments, the voltage is less than 1 KiloVolts. In one or more embodiments, the voltage is sufficient to cause the orientation of the dispersed material, which depends on the polymer chosen and dispersed phase electrical properties of the polymer and dispersed material. The electric field voltage cannot be too high as to cause an electrical break.

In one or more embodiments, the electric field is in a range of from 100 Volts/mm to 3000 Volts/mm. In one or more embodiments, the electric field is in a range of from 500 Volts/mm to 2000 Volts/mm. In one or more embodiments, the electric field is in a range of from 1500 Volts/mm to 2000 Volts/mm. In one or more embodiments, the electric field is less than 2000 Volts/mm. In one or more embodiments, the electric field is less than 1500 Volts/mm.

As disclosed above, one or more embodiments provide a top electrode, where the top electrode is a suitable porous material that allows solvent to pass through, while also acting as an electrode. In one or more embodiments, the porous material is a metal mesh. As used herein, mesh is defined as a grid-type shape having substantially regularly spaced openings therein.

One example of a mesh shape is shown in FIG. 1, but other shapes might be appreciated by one skilled in the art. In one or more embodiments, the metal mesh is coated with a non-stick coating, where non-stick can be defined as the coating substantially not sticking to the polymer solution or polymer film. Non-stick can also be defined as a low surface energy coating. In one or more embodiments, the coating is also a dielectric coating. In one or more embodiments, the coating is also a nonconductive coating. Where nonconductive coatings are utilized, the electrical field can be generated, and the nonconductive property provides better separation of the top electrode from the polymer film. This allows for an improved continuous process. One skilled in the art will know techniques for coating the top electrode.

In one or more embodiments, the diameter of the material used to form the mesh, or grid-type shape, is in a range of from 25 µm to 60 µm. In one or more embodiments, the diameter of the material used to form the mesh, or grid-type shape, is in a range of from 25 µm to 40 µm. In one or more embodiments, the diameter of the material used to form the mesh, or grid-type shape, is 35 µm or approximate thereto. In one or more embodiments, the diameter of the material used to form the mesh, or grid-type shape, is less than 40 µm.

In one or more embodiments, the average area of the openings in the mesh, or grid-type shape, is in a range of from 0.1 µm to 150 µm. In one or more embodiments, the average area of the openings in the mesh, or grid-type shape, is in a range of from 0.1 µm to 40 µm. In one or more embodiments, the average area of the openings in the mesh, or grid-type shape, is in a range of from 20 µm to 60 µm. In one or more embodiments, the average area of the openings in the mesh, or grid-type shape, is 40 µm or approximate thereto. In one or more embodiments, the average area of the openings in the mesh, or grid-type shape, is less than 60 µm. In one or more embodiments, the average area of the openings in the mesh, or grid-type shape, is less than 40 µm. The openings must be sufficiently sized as to allow solvent to pass through.

In one or more embodiments, the material used for the metal mesh can be selected from copper, steel, aluminum, stainless steel, brass, and bronze. Any flexible, conductive metal can be utilized.

In one or more embodiments, the coating can be selected from polytetrafluoroethylene (PTFE; generally known under the trade name of Teflon®), polytrifluoroethylene (PTrFE), polydimethylsiloxane (PDMS), and combinations thereof.

The top electrode is generally flexible as to be situated around two rollers, and can move simultaneously with the top surface of the polymer solution. The mesh also includes some slack, with respect to its positioning around the rollers, as to allow the mesh to move with the top surface of the polymer solution even as the thickness of the solution shrinks due to solvent evaporation. The mesh stays at the polymer solution's top surface due to capillary forces. As stated above, the non-stick coating reduces the surface energy of the mesh, thus making it easier to peel the mesh off the film after drying.

Based on the oriented chains that form, the resulting polymer films include depletion zones between the chains. These depletion zones are sufficiently spaced as to allow the product polymer films to exhibit general transparency to light. The thickness of the depletion zones can be affected by the concentration of dispersed material utilized. This transparency gives another advantageous property to the resulting polymer film. In one or more embodiments, the transparent polymer film allows all wavelengths of light to pass.

In one or more embodiments, the average thickness of the depletion zones is in a range of from 50 nm to 500 nm. In one or more embodiments, the average thickness of the depletion zones is in a range of from 80 nm to 200 nm. In one or more embodiments, the average thickness of the depletion zones is in a range of from 50 nm to 200 nm. In one or more embodiments, the average thickness of the depletion zones is less than 200 nm. In one or more embodiments, the average thickness of the depletion zones is more than 80 nm.

Advantageously, based on the alignment of the dispersed material, the present invention requires a lower concentration of dispersed material in order to achieve the percolation necessary for the desired properties. A sufficient percolation is generally necessary to achieve thermal conductivity and electrical conductivity in a product film. Embodiments of the present invention achieve directed percolation where long columns of the dispersed material are organized in the oriented direction. Embodiments of the present invention provide columns that are substantially depleted of side branches.

Figure 7A:
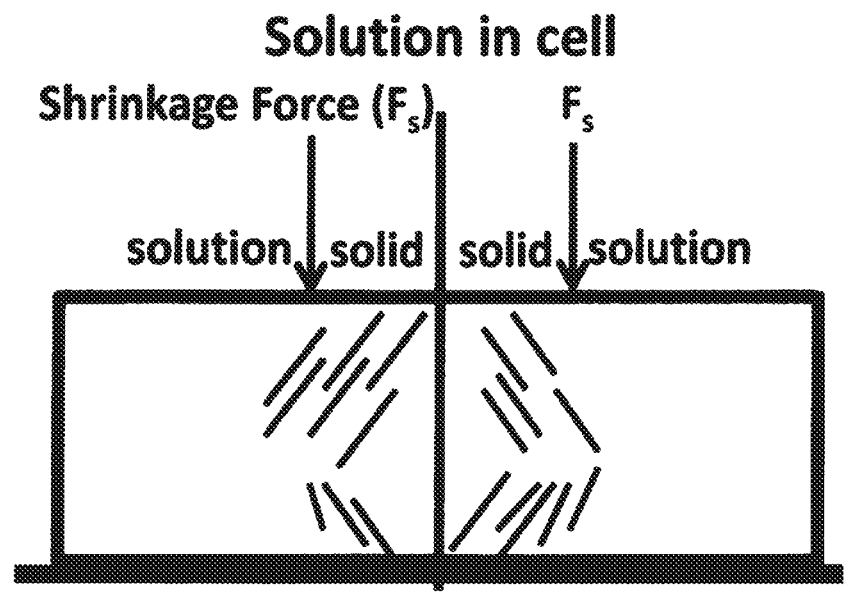
FIG. 7A provides a schematic showing a polymer solution in a cell, where the center part of the solution dries faster than the edge; thus, as the film shrinks due to drying, the nanoparticle chains tilt. The region closer to the center of the sample is more solid-like than the region closer to the edge, so the matrix film bends to the weaker, edge side.
Figure 7B:
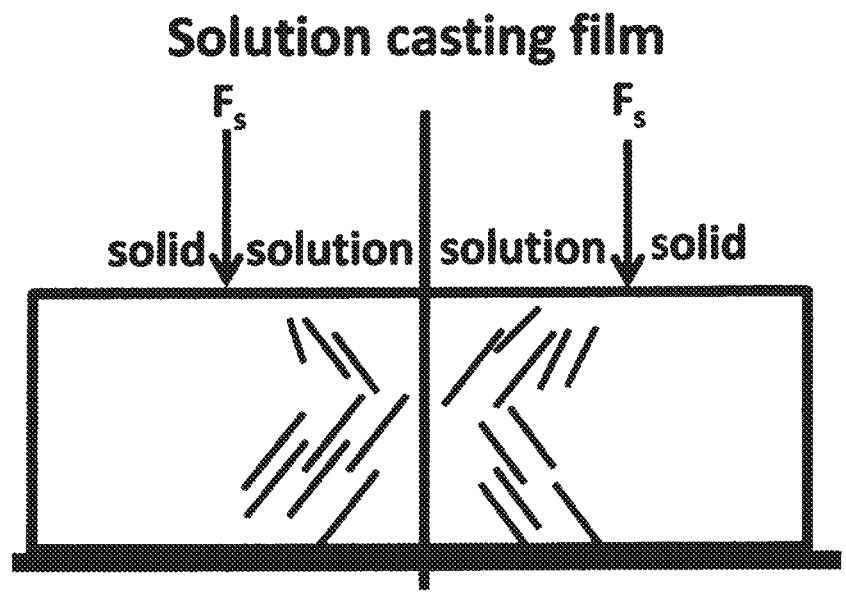
FIG. 7B provides a schematic showing a solution cast film, where the edge part of the solution dries faster than the center; thus, as the film shrinks due to drying, the nanoparticle chains tilt. The region closer to the edge of the sample is more solid-like than the region closer to the center, so the matrix film bends to the center.

In embodiments where the chains tilt upon drying of the solvent, the direction of tilt can depend on the type of depositing that is utilized. This is represented in FIG. 7A and FIG. 7B. For solutions in cells, the chains tend to tilt toward the edge of the cell. For solution casting, the chains all tend to tilt toward the center region. This difference occurs due the difference in drying gradients between these two processing methods.

With respect to the compression forces described above, the more solvent utilized, the more compression will occur. The compression occurs due to drying the solvent. Thus, more solvent results in more drying, which results in more compression.

EXAMPLES

Cell Samples

To prepare cell samples, a 6 cm×6 cm size square cell was prepared by sticking a 0.5 mm thick glass slide on the top of glass coated with indium tin oxide (ITO), serving as the bottom electrode. A polymer solution comprising polystyrene, toluene, and barium titanate nanoparticles was poured into the cell slowly. The solution with 0.5 mm thickness was covered by a stainless steel mesh coated with polytetrafluoroethylene, which served as the top electrode. The mesh was totally wetted by the solution. Various electric field strengths of 500 V/mm, 1000 V/mm, 1500 V/mm, and 2000 V/mm were applied between the mesh and the ITO-coated glass. The thickness of the solutions shrank due to solvent evaporation, and the mesh moved with the top surface of the solutions simultaneously due to the capillary force. The electric field was removed until most of the solvent evaporated and a solid film formed. Then, the mesh was peeled off from the film.

One Layer Casting

A doctor blade having a width of 76.2 mm was utilized with a solution casting method to cast a polymer solution comprising polystyrene, toluene, and barium titanate nanoparticles. The polymer solution was cast on to a stainless steel substrate having a speed of 50 cm/min in a roll to roll processing line. The casted polymer solution moved into the roll to roll electric field system, where the top roll included a mesh as the top electrode. The gap between the mesh and bottom electrode was adjusted to be the same as the thickness of the casted wet solution film and the solution film was sandwiched by the top mesh and bottom stainless steel substrate. The mesh and stainless steel substrate moved forward at the same speed, so that there was no shear force between the solution film and electrodes. An electric field was applied between the mesh and stainless steel substrate. After evaporating most of the solvent, the electric field was removed and the mesh was peeled off from the film.

Two Layer Casting

Two doctor blades having widths of 76.2 mm were utilized with a solution casting method to cast a two-layer polymer solution. The first layer, the bottom layer, was cast as a solution of polystyrene, toluene, and barium titanate nanoparticles. The first layer was cast at a thickness of 0.5 mm. A solution of polybutadiene and tetrahydrofuran (THF) was cast at a thickness of 0.5 mm on to the first layer to form a top layer. The two-layer solution moved into the roll to roll electric field system. Then, the same procedures were done for two-layer solution as the one-layer solution. After drying, the mesh was peeled off from the top layer film. The rough top layer was removed to get a smooth bottom layer having particles aligned in the "Z" direction.

Electric Field Strength

As shown in FIGS. 4A through 4E, as the electric field strength becomes stronger, the particle chains tended to be more vertically aligned along the electric field direction. The angles for FIGS. 4A through 4E were defined as the angles between the chain axes and the electric field direction. Thus, a vertical chain axis would have an angle of 0 degrees.

For this example, when the electric field strength was 500 V/mm, the angle distribution was broad, and the average angle was 54 degrees. At 1000 V/mm, the angle distribution became narrower and the average angle decreased to 32 degrees. At 1500 V/mm and 2000 V/mm, substantially vertically aligned particle chains were achieved. At 1500 V/mm, the average angle was 17 degrees, and at 2000 V/mm, the average angle was 10 degrees. The calculated Herman's orientation factor also increased with increased electric field strength.

While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A method of preparing a polymer film having an oriented dispersed material, the method comprising:
  casting a multi-layer polymer solution having a top surface, the multi-layer polymer solution comprising:
    a first polymer solution layer having a first polymer, a first solvent, and a dispersed material, and
    a second polymer solution layer forming the top surface on the first polymer solution layer and having a second polymer and a second solvent,
    where the second polymer solution layer is at least partially immiscible with the first polymer solution layer,
  supplying an electric field across an electric field application zone, where the electric field is generated by a first, mesh electrode having a first charge and a second electrode having a charge opposite of the first charge, passing the multi-layer polymer solution through the electric field application zone being supplied with the electric field, where the top surface of the multi-layer polymer solution contacts the first electrode to form an imprinted roughness in the top surface dictated by the mesh of the first electrode and to induce orientation of the dispersed material in the first polymer solution layer, evaporating the first solvent and the second solvent to thereby form a multi-layer polymer film comprising respective first and second polymer layers, and removing the second polymer layer carrying the imprinted roughness from the first polymer layer.

2. The method of claim 1, where the second polymer solution layer is fully immiscible with the first polymer solution layer.

3. The method of claim 2, where the multi-layer polymer film includes a target film layer as the first polymer layer and a sacrificial film layer as the second polymer layer, the target film layer being formed by the first polymer solution layer, the sacrificial film layer being formed by the second polymer solution layer, and the method further comprising the step of removing the second polymer layer as the sacrificial film layer from the target film layer so as to leave the remaining target film layer with a smooth top surface.

4. The method of claim 1, where the first electrode is a flexible metal mesh wrapped around two rollers, and where the flexible metal mesh is coated with a non-stick, non-conductive coating with respect to the second polymer solution layer, the method further comprising a step of moving the first electrode as the multi-layer polymer solution passes through the electric field application zone.

5. The method of claim 4, where the coating is selected from the group consisting of polytetrafluoroethylene (PTFE), polytrifluoroethylene (PTrFE), and polydimethylsiloxane (PDMS).

6. The method of claim 1, where the first solvent and the second solvent are the same.

7. The method of claim 1, where the first solvent and the second solvent are different.

8. The method of claim 1, the multi-layer polymer film having a thickness, where the dispersed material in the multi-layer polymer film is substantially vertically oriented with respect to the direction of the multi-layer polymer film thickness.

9. The method of claim 8, where the dispersed material forms two or more substantially vertically aligned chains, and where the substantially vertically aligned chains include a depletion zone therebetween.

10. The method of claim 1, where the step of casting the multi-layer polymer solution further includes a step of casting the first polymer solution layer and a step of casting the second polymer solution layer on top the first polymer solution layer.

11. The method of claim 10, where the step of casting the first polymer solution layer includes use of a first doctor blade and the step of casting the second polymer solution layer includes use of a second doctor blade.

12. The method of claim 1, where the step of casting the multi-layer polymer solution includes use of a multilayer slot die.

13. The method of claim 1, where the dispersed material is a plurality of particles.

14. The method of claim 13, where the particles are selected from the group consisting of nickel, barium, lead zirconate titanate (PZT) nanowires, barium titanate, calcium copper titanate, titanium dioxide, graphene, and graphite.

15. The method of claim 1, where the dispersed material is an additional polymer.

16. The method of claim 15, where the additional polymer is a conductive polymer selected from the group consisting of poly(fluorene), polyphenylene, polypyrene, polyazulene, polynaphthalene, poly(pyrrole) (PPY), polycarbazole, polyindole, polyazepine, polyaniline (PANI), poly(thiophene) (PT), poly(3,4-ethylenedioxythiophene) (PEDOT), poly(p-phenylene sulfide) (PPS), poly(acetylene)s (PAC), and poly(p-phenylene vinylene) (PPV).

17. The method of claim 1, where a strength of the electric field during said passing is in a range from 500 V/mm to 5000 V/mm.

* * * * *